United States Patent
Futakuchi et al.

(10) Patent No.: US 9,431,776 B2
(45) Date of Patent: Aug. 30, 2016

(54) CONNECTOR

(71) Applicant: Hitachi Metals, Ltd., Tokyo (JP)

(72) Inventors: Naoki Futakuchi, Hitachinaka (JP); Katsuya Akimoto, Hitachi (JP); Sachio Suzuki, Hitachi (JP); Jun Umetsu, Hitachi (JP); Shinya Hayashi, Hitachi (JP); Takahiro Futatsumori, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/681,453

(22) Filed: Apr. 8, 2015

(65) Prior Publication Data

US 2015/0295366 A1  Oct. 15, 2015

(30) Foreign Application Priority Data

Apr. 10, 2014  (JP) .................. 2014-080771

(51) Int. Cl.
*H01R 13/66* (2006.01)
*G06F 1/16* (2006.01)
*H01R 13/70* (2006.01)
*H02M 7/00* (2006.01)

(52) U.S. Cl.
CPC ............ *H01R 13/6683* (2013.01); *G06F 1/16* (2013.01); *H01R 13/6658* (2013.01); *H01R 13/70* (2013.01); *H02M 7/003* (2013.01)

(58) Field of Classification Search
CPC ................................................ H01R 13/6683
See application file for complete search history.

(56) References Cited

U.S. PATENT DOCUMENTS

| 9,231,353 | B2 * | 1/2016 | Lee ................... | H01R 13/6683 |
| 2005/0063116 | A1 * | 3/2005 | Rotheroe .......... | G01R 19/2513 361/90 |
| 2011/0187348 | A1 * | 8/2011 | Soneda ............... | H01R 25/003 324/117 H |
| 2012/0091824 | A1 * | 4/2012 | Campolo ............ | B60L 11/1818 307/135 |
| 2012/0126818 | A1 * | 5/2012 | Ishihara ............. | G01R 31/3696 324/426 |
| 2012/0302092 | A1 * | 11/2012 | Kaps .................. | H01R 13/6683 439/535 |

(Continued)

FOREIGN PATENT DOCUMENTS

| JP | 2010-239811 | 10/2010 |
| JP | 2013-105714 | 5/2013 |

*Primary Examiner* — Ross Gushi
(74) *Attorney, Agent, or Firm* — Roberts Mlotkowski Safran Cole & Calderon

(57) ABSTRACT

A connector for being attached to a power-supply unit including a switching element includes a connecting terminal including an end portion connected to an output terminal in a casing of the power-supply unit, a housing fixed to the casing and enclosing at least a portion of the connecting terminal, a current sensor to detect a magnetic field generated by an electric current flowing through the connecting terminal, and a signal line for transmitting an output signal of the current sensor. The signal line includes an extension region with a predetermined length from one end on a side of the current sensor. The extension region extends in a direction orthogonal to a direction of electric current flowing through the connecting terminal.

4 Claims, 5 Drawing Sheets

(56) References Cited

U.S. PATENT DOCUMENTS

| | | | | |
|---|---|---|---|---|
| 2013/0015706 A1* | 1/2013 | Chien | G06F 1/266 | 307/38 |
| 2013/0015929 A1* | 1/2013 | Bryan | B60Q 11/005 | 335/7 |
| 2013/0040177 A1* | 2/2013 | Hashio | H01M 2/305 | 429/93 |
| 2013/0045626 A1* | 2/2013 | Soneda | G01R 33/07 | 439/544 |
| 2013/0106449 A1* | 5/2013 | Kikuchi | H01M 10/48 | 324/713 |
| 2013/0147463 A1* | 6/2013 | Takase | G01R 31/3696 | 324/117 R |
| 2013/0154808 A1* | 6/2013 | Han | H01R 13/465 | 340/10.5 |
| 2013/0162053 A1* | 6/2013 | Iizuka | H01H 47/00 | 307/140 |
| 2013/0252050 A1* | 9/2013 | Uematsu | H01R 11/287 | 429/91 |
| 2013/0313899 A1* | 11/2013 | Soneda | G01R 21/133 | 307/11 |
| 2013/0314069 A1* | 11/2013 | Suzuki | H02M 5/02 | 323/318 |
| 2013/0317770 A1* | 11/2013 | Soneda | H01R 13/6683 | 702/61 |
| 2015/0102803 A1* | 4/2015 | Young | G01R 15/18 | 324/127 |
| 2015/0137757 A1* | 5/2015 | Bencuya | H01R 13/633 | 320/111 |
| 2015/0204915 A1* | 7/2015 | Okuyama | G01R 19/0092 | 324/117 R |
| 2015/0204916 A1* | 7/2015 | Akimoto | G01R 19/0092 | 702/64 |
| 2015/0204919 A1* | 7/2015 | Akimoto | G01R 19/15 | 324/244 |
| 2015/0233980 A1* | 8/2015 | Umetsu | G01R 33/093 | 439/620.22 |
| 2015/0289420 A1* | 10/2015 | Imahori | H01F 17/06 | 174/350 |
| 2015/0295366 A1* | 10/2015 | Futakuchi | H01R 13/6683 | 439/620.21 |
| 2015/0316637 A1* | 11/2015 | Futakuchi | G01R 35/00 | 702/104 |

* cited by examiner

CONNECTOR

The present application is based on Japanese patent application No. 2014-080771 filed on Apr. 10, 2014, the entire contents of which are incorporated herein by reference.

BACKGROUND OF THE INVENTION

1. Field of the Invention

The invention relates to a connector to be attached to a power-supply unit with switching elements.

2. Description of the Related Art

Some of conventional power-supply units, such as an inverter device, having switching elements are provided with a sensor for detecting an output electric current. JP-A-2010-239811 discloses an inverter device that plural current sensors are housed in a case of the device and a motor is feedback-controlled according to current values detected by the plural current sensors.

A connectorized cable has been proposed which allows a current sensor to be provided separately from an inverter device and thus allows the inverter device to be downsized. A connectorized cable disclosed in JP-A-2013-105714 has a connector having plural bus bars to be connected to output terminals of an inverter device, plural cables connected to the inverter device via the connector and plural current sensors for detecting currents flowing through the plural cables, and the plural current sensors are arranged in the connector. Output signals of the current sensors are output to the inverter device via a harness.

SUMMARY OF THE INVENTION

The connectorized cable disclosed in JP-A-2013-105714 is adapted so as to amplify the output signals of the current sensors in the inverter device since currents flowing through electric wires of the harness to transmit output signals from the current sensors are smaller than currents flowing through the bus bars. Therefore, if noise is superposed on the output signals transmitted from the current sensors through the harness, the noise can be also amplified so as to affect accuracy in feedback-control.

Especially when the current sensors are arranged in the connector as disclosed in JP-A-2013-105714, the output signals of the current sensors may be affected by the noise since an end portion of the harness is located close to the bus bars.

It is an object of the invention to provide a connector that has current sensors for detecting currents output from a power-supply unit and that prevents noise from being superposed on a signal line to transmit output signals from the current sensors.

According to one embodiment of the invention, a connector for being attached to a power-supply unit comprising a switching element comprises:

a connecting terminal comprising an end portion connected to an output terminal in a casing of the power-supply unit;

a housing fixed to the casing and enclosing at least a portion of the connecting terminal;

a current sensor to detect a magnetic field generated by an electric current flowing through the connecting terminal; and a signal line for transmitting an output signal of the current sensor, wherein the signal line comprises an extension region with a predetermined length from one end on a side of the current sensor, and wherein the extension region extends in a direction orthogonal to a direction of electric current flowing through the connecting terminal.

Effects of the Invention

According to one embodiment of the invention, a connector can be provided that has current sensors for detecting currents output from a power-supply unit and that prevents noise from being superposed on a signal line to transmit output signals from the current sensors.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

Figure 1:
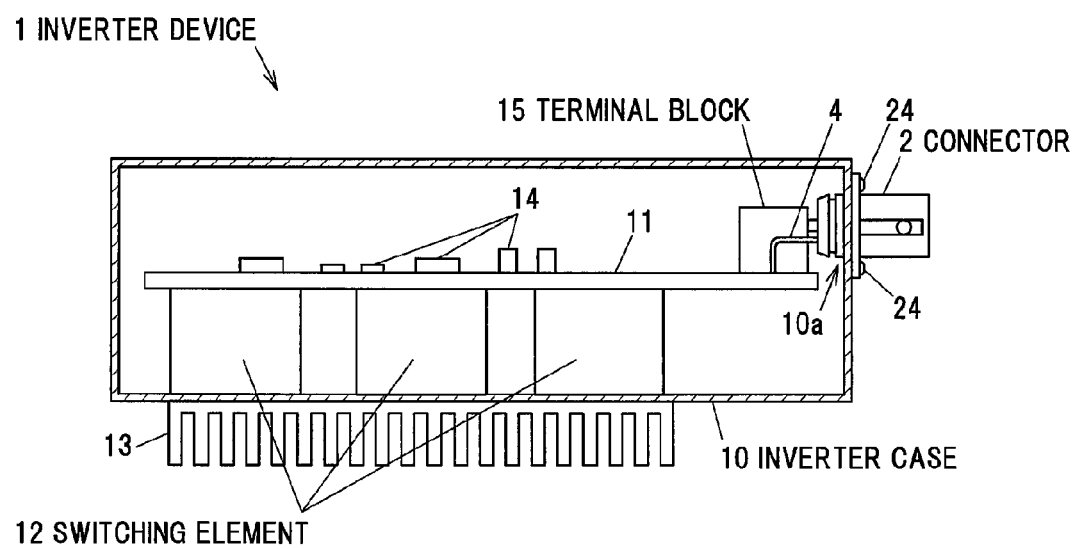
FIG. 1 is a schematic view showing an inverter device provided with a connector in an embodiment of the present invention.

FIG. 1 is a schematic view showing an inverter device as a power-supply unit provided with a connector in the present embodiment. An inverter device 1 is mounted on, e.g., a vehicle to convert DC voltage output from a rechargeable battery into AC voltage by PWM (Pulse Width Modulation) and to output the AC voltage to a three-phase AC motor which is a drive source for driving the vehicle.

The inverter device 1 has an inverter case 10 as a casing, a circuit board 11 fixed to the inverter case 10, plural switching elements 12 fixed to the circuit board 11, a heat-radiating fin 13 for cooling the switching elements 12, plural circuit components 14 for switching on and off of the switching elements 12, a terminal block 15 and a connector 2. The circuit board 11, the plural switching elements 12, the circuit components 14 and the terminal block 15 are housed in the inverter case 10. A portion of the connector 2 is housed in the inverter case 10 and the remaining portion is exposed from the inverter case 10.

The inverter case 10 is formed of, e.g., a conductive metal such as aluminum alloy. In FIG. 1, a portion of the inverter case 10 is cut to show the inside thereof. The heat-radiating fin 13 is arranged at a position at which the bottom of the inverter case 10 is sandwiched between itself and the plural switching elements 12.

The switching elements 12 are, e.g., power transistors and each phase (U-phase, V-phase and W-phase) has two switching elements 12. In other words, in the present embodiment, six switching elements 12 are fixed to the circuit board 11. Three of the six switching elements 12 are shown in FIG. 1.

The plural circuit components 14 include a logic circuit element for performing PWM by switching on/off of the switching elements 12, an amplifying element and a passive element such as resistor or capacitor, etc., and are mounted on a mounting surface of the circuit board 11 on the opposite side to the plural switching elements 12.

The terminal block 15 is arranged at an end portion of the circuit board 11 on the mounting surface side. The terminal block 15 has plural output terminals (described later) each outputting a phase current. The current contains harmonic components due to PWM performed by switching the switching elements 12.

The connector 2 is partially inserted into an opening 10*a* formed on the inverter case 10 and is removably provided on the inverter case 10. The connector 2 has plural connecting terminals which correspond to the output terminals outputting multi-phase currents from the inverter device 1.

In addition, the connector 2 has plural current sensors corresponding to the multi-phase currents output from the inverter device 1, and output signals of the plural current sensors are transmitted to the circuit board 11 through a signal line 4. The output signals are used for feedback-control of the three-phase AC motor.

Figure 2:
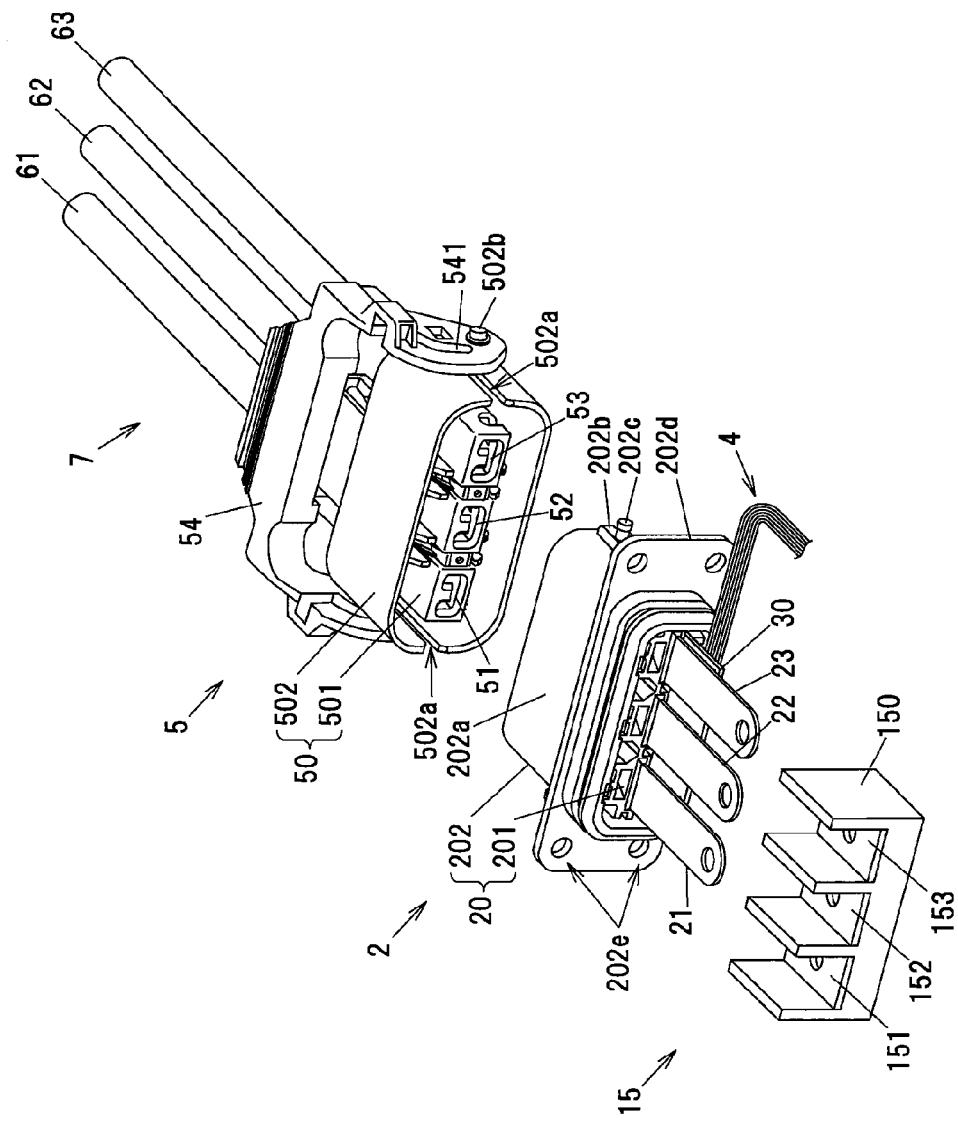
FIG. 2 is a perspective view showing a terminal block, the connector and one end of a wire harness having a mating connector to be fitted to the connector.
Figure 3:
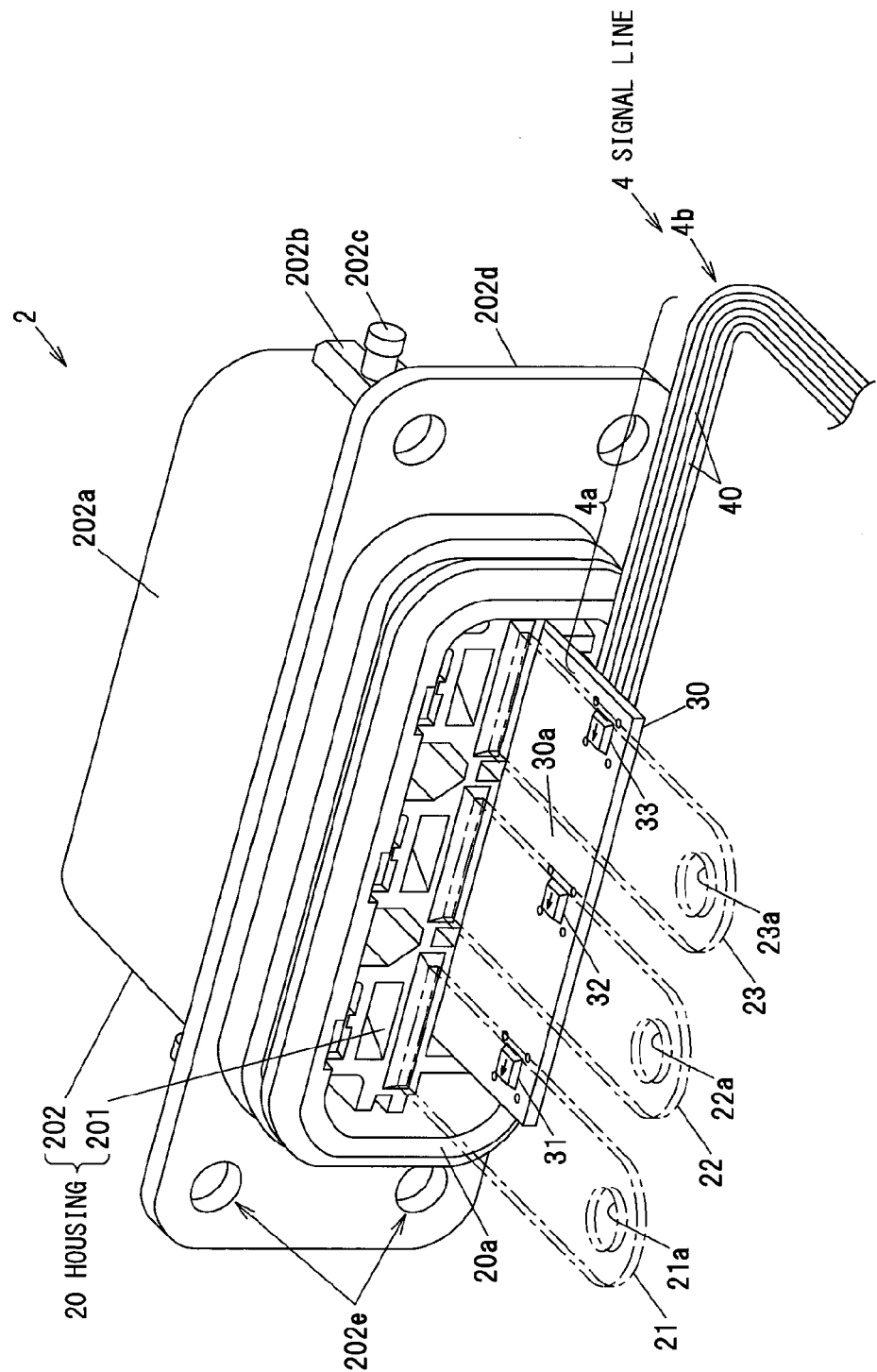
FIG. 3 is an enlarged view showing the connector in FIG. 2.
Figure 4:
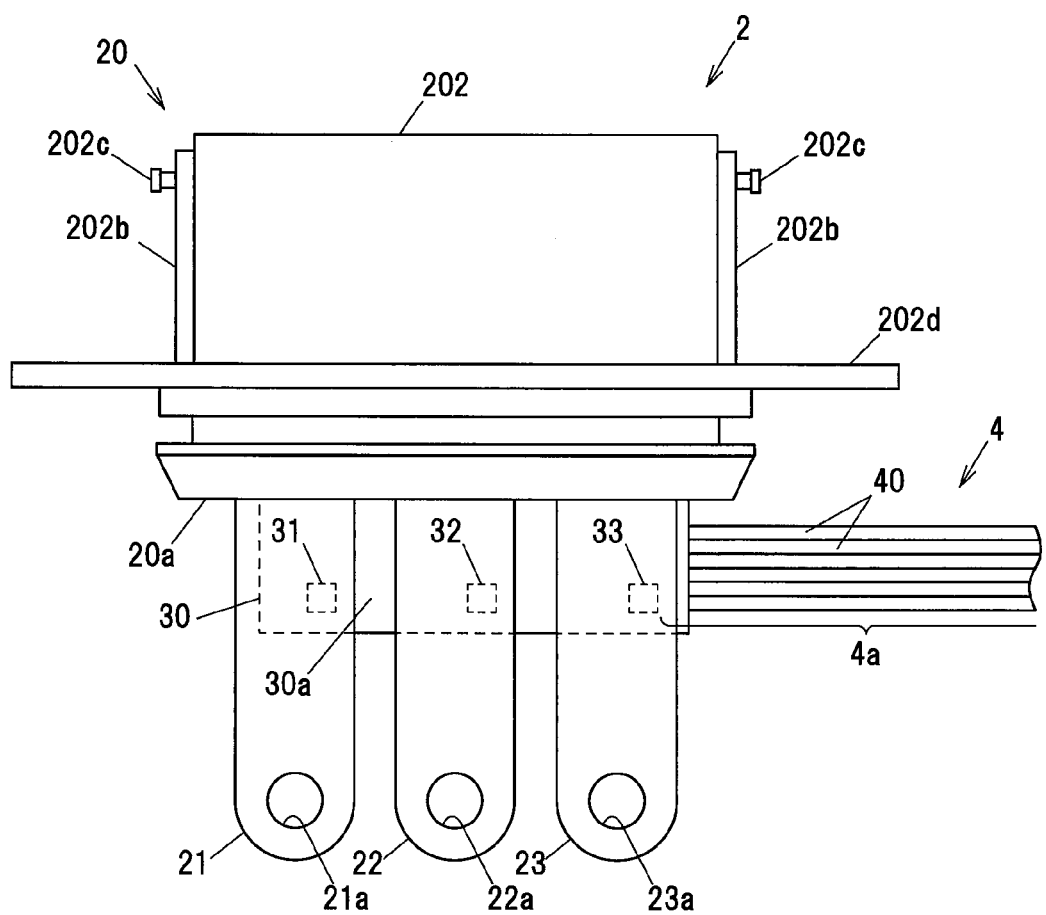
FIG. 4 is a front view showing the connector.

FIG. 2 is a perspective view showing the terminal block 15, the connector 2 and one end of a wire harness 7 having a mating connector 5 to be fitted to the connector 2. FIG. 3 is an enlarged view showing the connector 2 in FIG. 2. FIG. 4 is a front view showing the connector 2. In FIG. 3, first to third connecting terminals 21 to 23 of the connector 2 are indicated by a phantom line (dash-dot line) and a portion on the far side is indicated by a solid line.

The terminal block 15 has a main body 150 formed of a resin and first to third output terminals 151 to 153. The first output terminal 151 is an output terminal for U-phase current, the second output terminal 152 is an output terminal for V-phase current, and the third output terminal 153 is an output terminal for W-phase current.

The connector 2 is provided with the first to third connecting terminals 21 to 23 of which one end portions are connected to the first to third output terminals 151 to 153 of the terminal block 15 housed in the inverter case 10, a housing 20 at least partially housing the first to third connecting terminals 21 to 23, first to third current sensors 31 to 33 which are housed in the housing 20 and detect magnetic fields generated by currents flowing through the first to third connecting terminals 21 to 23, a substrate 30 mounting the first to third current sensors 31 to 33, and the signal line 4 for transmitting output signals of the first to third current sensors 31 to 33.

The first to third connecting terminals 21 to 23 of the connector 2 are arranged in parallel in a predetermined alignment direction so as to correspond to the first to third output terminals 151 to 153. In the present embodiment, one end portions of the first to third connecting terminals 21 to 23 are exposed from the housing 20 and the exposed portions are respectively connected to the first to third output terminals 151 to 153 of the terminal block 15. The first to third connecting terminals 21 to 23 have a plate shape at an end portion to be connected to the first to third output terminals 151 to 153 of the terminal block 15 and respectively have insertion holes 21*a*, 22*a* and 23*a* at a tip portion to insert bolts (not shown) used for fixing to the terminal block 15.

The first connecting terminal 21 of the connector 2 is fixed to the terminal block 15 by a bolt (not shown) so as to be in contact with the first output terminal 151. Likewise, the second and third connecting terminals 22 and 23 are fixed to the terminal block 15 by bolts (not shown) so as to be respectively in contact with the second and third output terminals 152 and 153.

The housing 20 of the connector 2 is composed of an inner housing 201 formed of a resin and an outer housing 202 formed of a conductive metal such as aluminum alloy. The inner housing 201 is housed in the outer housing 202. The first to third connecting terminals 21 to 23 are held by the inner housing 201.

Also, the first to third connecting terminals 21 to 23 are arranged in parallel in a predetermined alignment direction such that the second connecting terminal 22 is located between the first connecting terminal 21 and the third connecting terminal 23. The one end portions of the first to third connecting terminals 21 to 23 are parallel to each other.

The outer housing 202 has a cylindrical main body 202*a*, a pair of protruding strips 202*b* (only one of the protruding strips 202*b* is shown in FIG. 2) formed on the outer surface of the main body 202*a*, protrusions 202*c* provided at longitudinal end portions of the protruding strips 202*b*, and a plate-like flange 202*d* formed to extend outward from the main body 202*a*. The pair of protruding strips 202*b* are formed on the main body 202*a* at both ends in the alignment direction of the first to third connecting terminals 21 to 23. Each protrusion 202*c* is formed at an end portion of the protruding strip 202*b* on the opposite side to the flange 202*d*. The flange 202*d* has a rectangular plate shape with bolt insertion holes 202*e* formed at the four corners. The connector 2 is removably fixed to the inverter case 10 by bolts 24 (shown in FIG. 1) inserted into the bolt insertion holes 202*e*.

The first to third current sensors 31 to 33 are GMR (Giant Magneto Resistive effect) sensors having a giant magnetoresistive element. The giant magnetoresistive element uses a giant magnetoresistive effect which allows a significant change in the electrical resistance to be obtained with a small change in the magnetic field. In more detail, whereas a magnetoresistive effect of, e.g., a Hall element provides about several percent of the rate of change in the electrical resistance, the giant magnetoresistive element using the giant magnetoresistive effect can obtain about several tens percent of the rate of change in the electrical resistance. In addition, the giant magnetoresistive element has the property that it detects the strength of the magnetic field in a direction along a predetermined detection axis but does not detect a magnetic field in a direction orthogonal to the detection axis. In FIG. 3, the detection axis is indicated on the first to third current sensors 31 to 33 by arrows.

The first current sensor 31 is arranged in the vicinity of the first connecting terminal 21 to detect the strength of the magnetic field generated by the U-phase current. The second current sensor 32 is arranged in the vicinity of the second connecting terminal 22 to detect the strength of the magnetic field generated by the V-phase current. Also, the third current sensor 33 is arranged in the vicinity of the third connecting terminal 23 to detect the strength of the magnetic field generated by the W-phase current.

The U-, V- and W-phase currents flow along a longitudinal direction of the first to third connecting terminals 21 to 23. The detection axis of the first current sensor 31 is along a direction of the magnetic field generated by the U-phase current flowing through the first connecting terminal 21. The detection axis of the second current sensor 32 is along a direction of the magnetic field generated by the V-phase current flowing through the second connecting terminal 22. In addition, the detection axis of the third current sensor 33 is along a direction of the magnetic field generated by the W-phase current flowing through the third connecting terminal 23.

The first to third current sensors 31 to 33 are mounted on the substrate 30 which is held by the housing 20. In the present embodiment, the substrate 30 is held by the inner housing 201. In the present embodiment, a portion of the substrate 30 is exposed to outside through an open end 20*a* of the housing 20. In detail, the first to third current sensors 31 to 33 are mounted on a mounting surface 30*a* of the substrate 30 at a portion exposed from the housing 20. The mounting surface 30*a* faces the first to third connecting terminals 21 to 23. In other word, the first to third current sensors 31 to 33 are arranged between the substrate 30 and the first to third connecting terminals 21 to 23.

The signal line 4 for transmitting the output signals of the first to third current sensors 31 to 33 is composed of plural (six in the present embodiment) insulated wires 40 which are routed inside the inverter case 10 by a guide member (not shown). The signal line 4 has an extension region 4*a* from one end on the current sensor 31 to 33 side to a predetermined length and the extension region 4*a* extends in a direction orthogonal to a direction of electric current flowing through the first to third connecting terminals 21 to 23.

The "direction orthogonal to" here means that the extending direction of the extension region 4*a* is substantially orthogonal to the direction of electric current flowing through the first to third connecting terminals 21 to 23. Thus, the extending direction of the extension region 4*a* is not limited to a direction intersecting with the direction of electric current flowing through the first to third connecting terminals 21 to 23 at 90° and includes also directions intersecting at 90±10° (not less than 80° and not more than 100°).

The extension region 4*a* of the signal line 4 extends also along an alignment direction of the first to third connecting terminals 21 to 23. In the present embodiment, each of the insulated wires 40 of the signal line 4 is connected to a longitudinal end portion of the substrate 30. The longitudinal direction of the substrate 30 is parallel to the alignment direction of the first to third connecting terminals 21 to 23 and an end portion of each insulated wire 40 is connected to the substrate 30 at a longitudinal end portion on the third connecting terminal 23 side.

The length of the extension region 4*a* of the signal line 4 (a length between a tip portion connected to below-described electrodes of the substrate 30 and a bent portion 4*b* at which the signal line 4 is bent) is desirably not less than 5 mm, more desirably, not less than 30 mm.

The portion to which each insulated wire 40 of the signal line 4 is connected is not limited to the longitudinal end portion of the substrate 30 and may be, e.g., the longitudinal center of the substrate 30, or alternatively, the insulated wires 40 may be directly connected to respective terminals of the first to third current sensors 31 to 33. In addition, although FIG. 3 shows an example in which the signal line 4 is bent at the bent portion 4*b* at an angle of about 90° and a portion extending from the bent portion 4*b* is parallel to the longitudinal direction of the first to third connecting terminals 21 to 23, it is not limited thereto. It is possible to appropriately determine the wiring route of the signal line 4 according to the configuration of the inverter device 1.

Figure 5:
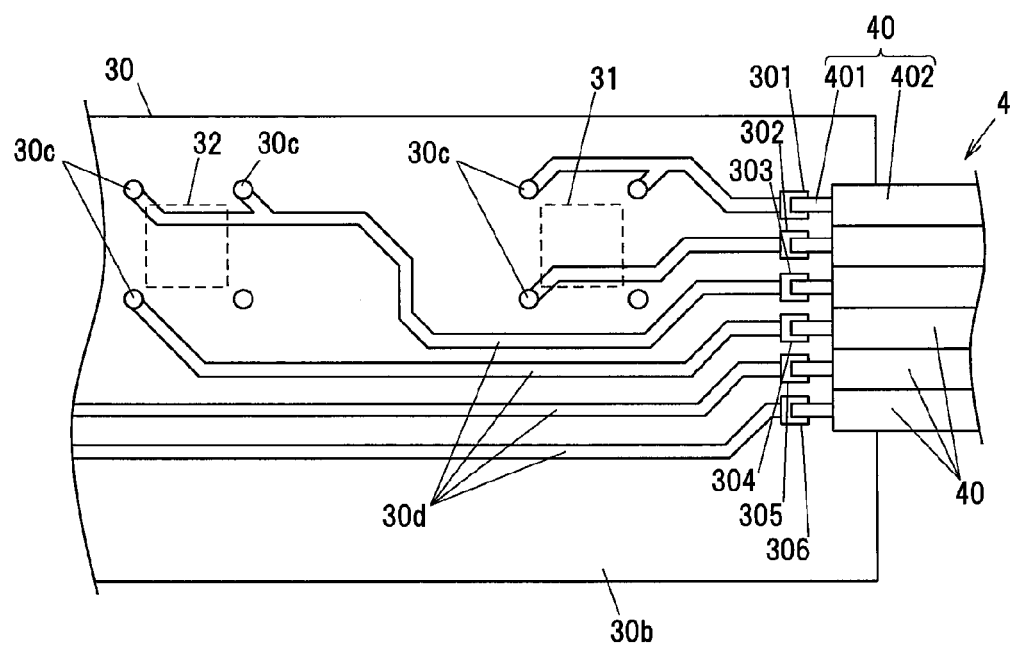
FIG. 5 is a plan view showing a non-mounting surface side of a substrate.

FIG. 5 is a plan view showing a non-mounting surface 30*b* side, which is the opposite side to the mounting surface 30*a*, of the substrate 30. In FIG. 5, the first to third current sensors 31 to 33 mounted on the mounting surface 30*a* are indicated by a dashed line.

First to sixth electrodes 301 to 306, plural vias 30*c* and a wiring pattern 30*d* are formed on the non-mounting surface 30*b* of the substrate 30. The vias 30*c* penetrate through the substrate 30 in a thickness direction between the mounting surface 30*a* and the non-mounting surface 30*b*. The wiring pattern 30*d* conducts the output signals of the first to third current sensors 31 to 33 to the first to sixth electrodes 301 to 306.

The first electrode 301 is electrically connected to a ground terminal of the first current sensor 31 via the wiring pattern 30*d* and the via 30*c*, and the second electrode 302 is electrically connected to a signal output terminal of the first current sensor 31 via the wiring pattern 30*d* and the via 30*c*. Likewise, the third electrode 303 is electrically connected to a ground terminal of the second current sensor 32 via the wiring pattern 30*d* and the via 30*c*, and the fourth electrode 304 is electrically connected to a signal output terminal of the second current sensor 32 via the wiring pattern 30*d* and the via 30*c*. Also, the fifth electrode 305 is electrically connected to a ground terminal of the third current sensor 33 via the wiring pattern 30*d* and the via 30*c*, and the sixth electrode 306 is electrically connected to a signal output terminal of the third current sensor 33 via the wiring pattern 30*d* and the via 30*c*.

Each insulated wire 40 is composed of a core wire 401 formed of a high-conductivity metal such as copper and an insulation 402 covering the core wire 401. At an end portion of each insulated wire 40, the core wire 401 is exposed from the insulation 402 and the exposed core wire 401 is connected to one of the first to sixth electrodes 301 to 306 by, e.g., soldering.

Referring to FIG. 2, other end portions of the first to third connecting terminals 21 to 23 come into contact with first to third connecting terminals 51 to 53 of the mating connector 5 when the connector 2 is fitted to the mating connector 5. The mating connector 5 has a housing 50, the first to third connecting terminals 51 to 53 and a pivot lever 54. The housing 50 is composed of an inner housing 501 formed of a resin and an outer housing 502 formed of a conductive metal such as aluminum alloy. The inner housing 501 is housed in the outer housing 502. The first to third connecting terminals 51 to 53 are held by the inner housing 501.

On the outer housing 502, a pair of sliding grooves 502*a* for inserting the protruding strips 202*b* of the connector 2 are formed at both end portions in an alignment direction of the first to third connecting terminals 51 to 53. In addition, protrusions 502*b* to be a rotary shaft of the pivot lever 54 are formed on the outer housing 502. Curved grooves 541 curved in an arc shape are formed on the pivot lever 54. Rotational movement of the pivot lever 54 around the protrusions 502*b* pulls the protrusions 202*c* of the connector 2 along the curved grooves 541 into the back of the sliding grooves 502*a*, thereby securely fitting the connector 2 to the mating connector 5.

One end portion of a U-phase wire 61 is connected to the first connecting terminal 51. One end portion of a V-phase wire 62 is connected to the second connecting terminal 52. In addition, one end portion of a W-phase wire 63 is connected to the third connecting terminal 53. Other end portions of the U-phase wire 61, the V-phase wire 62 and the W-phase wire 63 are electrically connected respectively to U-, V- and W-phase windings of the three-phase AC motor via a connector (not shown).

The inverter device 1 configured as described above supplies U-, V- and W-phase currents to the three-phase AC motor through the wire harness 7 connected to the connector 2. The first to third current sensors 31 to 33 detect the magnetic fields generated by the U-, V- and W-phase currents and send the output signals to the circuit components 14 in the inverter case 10 through the signal line 4.

Functions and Effects of the Embodiment

The following functions and effects are obtained in the embodiment.

(1) Since the extension region 4a of the signal line 4 extends in a direction orthogonal to the direction of electric currents flowing through the first to third connecting terminals 21 to 23, it is possible to suppress superposition of noise, which is generated by harmonic components of the current flowing through the first to third connecting terminals 21 to 23, on signals (the output signals of the first to third current sensors 31 to 33) propagating through the signal line 4. That is, considering that strength of an electromagnetic wave generated by harmonic components contained in the U-, V- and W-phase currents decreases inversely proportional to the square of a distance from the first to third connecting terminals 21 to 23, a length of the signal line 4 passing through a region with high electromagnetic wave strength is reduced in the present embodiment by providing the extension region 4a on the signal line 4 from an end portion connected to the first to sixth electrodes 301 to 306 to a predetermined length so as to extend in a direction orthogonal to a direction of electric current flowing through the first to third connecting terminals 21 to 23, thereby suppressing the effect of noise caused by harmonic components contained in each phase current. Especially, in the present embodiment, since the extension region 4a of the signal line 4 extends along a predetermined alignment direction of the first to third connecting terminals 21 to 23, an influence of a magnetic field generated by a current flowing through the first to third connecting terminals 21 to 23 on the signals propagating through the signal line 4 can be reduced as much as possible.

(2) Arranging the first to third current sensors 31 to 33 in the housing 20 of the connector 2 allows the first to third current sensors 31 to 33 to be placed farther from the plural switching elements 12 as a noise source than the case where the current sensors for detecting a magnetic field generated by each phase current are mounted on, e.g., the circuit board 11. This suppresses an influence of electromagnetic wave generated by the plural switching elements 12 and allows detection accuracy of the first to third current sensors 31 to 33 to be increased. In addition, since it is not necessary to arrange plural current sensors on the circuit board 11, it is possible to downsize the circuit board 11, leading to a decrease in the size of the inverter device 1.

(3) The first to third current sensors 31 to 33 are GMR sensors having a giant magnetoresistive element and thus can highly accurately detect the magnetic fields generated by the currents flowing through the first to third connecting terminals 21 to 23.

(4) The first to third current sensors 31 to 33 are mounted on the substrate 30 which is held by the housing 20. Therefore, it is possible to easily fix the first to third current sensors 31 to 33 at appropriate positions suitable for detecting the magnetic fields. In addition, it is possible to transmit the output signals of the first to third current sensors 31 to 33 through the signal line 4 only by connecting the core wires 401 of the insulated wires 40 to electrodes (the first to sixth electrodes 301 to 306) formed on the substrate 30 by soldering, etc. Therefore, connection of the signal line 4 is easy.

Summary of Embodiments

Technical ideas understood from the embodiment will be described below citing the reference numerals, etc., used for the embodiment. However, each reference numeral described below is not intended to limit the constituent elements in the claims to the members, etc., specifically described in the embodiment.

[1] A connector (2) for being attached to a power-supply unit (the inverter device 1) comprising switching elements (12), the connector (2) comprising: connecting terminals (21 to 23) comprising an end portion connected to output terminals (151 to 153) in a casing (the inverter case 10) of the power-supply unit (the inverter device 1); a housing (20) fixed to the casing (the inverter case 10) and enclosing at least a portion of the connecting terminals (21 to 23); current sensors (31 to 33) to detect a magnetic field generated by electric currents flowing through the connecting terminals (21 to 23); and a signal line (4) for transmitting output signals of the current sensors (31 to 33), wherein the signal line (4) comprises an extension region (4a) with a predetermined length from one end on a side of the current sensors (31 to 33), and wherein the extension region (4a) extending in a direction orthogonal to a direction of electric current flowing through the connecting terminals (21 to 23).

[2] The connector (2) as defined in [1], wherein a plurality of the connecting terminals (21 to 23) are arranged in parallel in a predetermined alignment direction so as to correspond to a plurality of the output terminals (151 to 153) for outputting multi-phase currents from the power-supply unit (the inverter device 1), and wherein the extension region (4a) of the signal line (4) extends in the alignment direction.

[3] The connector (2) as defined in in [1] or [2], wherein a plurality of the current sensors (31 to 33) are mounted on a substrate (30) held by the housing (20) so as to each detect magnetic fields generated by multi-phase currents outputted from the power-supply unit (the inverter device 1), and wherein the one end of the signal line (4) is connected to electrodes (301 to 306) on the substrate (30).

[4] The connector (2) as defined in any one of [1] to [3], wherein the current sensors (31 to 33) comprise a GMR sensor comprising a giant magnetoresistive element, and wherein a detection axis of the giant magnetoresistive element is along a direction of magnetic fields generated by the electric currents flowing through the connecting terminals (21 to 23).

Although the embodiment of the invention has been described, the invention according to claims is not to be limited to the embodiment. Further, please note that all combinations of the features described in the embodiment are not necessary to solve the problem of the invention.

In addition, the invention can be appropriately modified and implemented without departing from the gist thereof. For example, although the connector 2 used for the inverter device 1 has been described in the embodiment, it is not limited thereto. The connector 2 may be applied to various power-supply units, such as converter system, having switching elements.

In addition, although the first to third connecting terminals 21 to 23 partially housed in the housing 20 have been described in the embodiment, it is not limited thereto. The first to third connecting terminals 21 to 23 may be entirely housed in the housing 20. In other words, it is only necessary that at least a portion of the first to third connecting terminals 21 to 23 is housed in the housing 20.

In addition, although the signal line 4 extending out along the predetermined alignment direction of the first to third connecting terminals 21 to 23 has been described in the embodiment, it is not limited thereto. It is possible to obtain a certain effect as long as the signal line 4 led out of the housing 20 extends out in the direction orthogonal to the extending direction of the one end portions of the first to third connecting terminals 21 to 23.

In addition, although the first to third current sensors 31 to 33 as GMR sensors have been described in the embodiment, it is not limited thereto. For example, hall ICs may be used as the first to third current sensors 31 to 33.

What is claimed is:

1. A connector for being attached to a power-supply unit comprising a switching element, the connector comprising:
   a connecting terminal comprising an end portion connected to an output terminal in a casing of the power-supply unit;
   a housing fixed to the casing and enclosing at least a portion of the connecting terminal, including an inner housing formed from resin;
   a current sensor to detect a magnetic field generated by an electric current flowing through the connecting terminal; and
   a signal line for transmitting an output signal of the current sensor,
   wherein the signal line comprises an extension region with a predetermined length from one end on a side of the current sensor, and
   wherein the extension region extends in a direction orthogonal to a direction of electric current flowing through the connecting terminal.

2. The connector according to claim 1, wherein a plurality of ones of the connecting terminal are arranged in parallel in a predetermined alignment direction so as to correspond to a plurality of ones of the output terminal for outputting multi-phase currents from the power-supply unit, and wherein the extension region of the signal line extends along the alignment direction.

3. The connector according to claim 1, wherein a plurality of ones of the current sensor are mounted on a substrate held by the housing so as to each detect a magnetic field generated by the multi-phase currents outputted from the power-supply unit, and wherein the one end of the signal line is connected to an electrode on the substrate.

4. The connector according to claim 1, wherein the current sensor comprises a GMR sensor comprising a giant magnetoresistive element, and wherein a detection axis of the giant magnetoresistive element is along a direction of a magnetic field generated by the electric current flowing through the connecting terminal.

* * * * *